US012587740B2

(12) United States Patent
Huang

(10) Patent No.: US 12,587,740 B2
(45) Date of Patent: Mar. 24, 2026

(54) SENSOR DEVICE AND OPERATING METHOD THEREOF

(71) Applicant: Getac Technology Corporation, New Taipei (TW)

(72) Inventor: Cheng-Liang Huang, Taipei (TW)

(73) Assignee: Getac Technology Corporation, New Taipei City (TW)

( * ) Notice: Subject to any disclaimer, the term of this patent is extended or adjusted under 35 U.S.C. 154(b) by 125 days.

(21) Appl. No.: 18/518,679

(22) Filed: Nov. 24, 2023

(65) Prior Publication Data

US 2025/0027748 A1     Jan. 23, 2025

Related U.S. Application Data

(60) Provisional application No. 63/527,509, filed on Jul. 18, 2023.

(51) Int. Cl.
H04N 23/667 (2023.01)
F41C 33/02 (2006.01)
(Continued)

(52) U.S. Cl.
CPC ......... H04N 23/667 (2023.01); F41C 33/029 (2013.01); G06F 1/3231 (2013.01);
(Continued)

(58) Field of Classification Search
CPC .... F41C 33/029; G06F 1/3231; G06F 1/3265; H04N 7/185; H04N 7/188; H04N 23/62;
(Continued)

(56) References Cited

U.S. PATENT DOCUMENTS 10,866,054 B2 * 12/2020 Stewart .................. H04N 7/188
2008/0061991 A1    3/2008 Lee et al.
(Continued)

FOREIGN PATENT DOCUMENTS

CN      107407543 A    11/2017
CN      112683108 A    4/2021
(Continued)

OTHER PUBLICATIONS

Search Report issued on May 15, 2024 for EP application No. 23213642.4, 8 pages.

*Primary Examiner* — Daniel M Pasiewicz
(74) *Attorney, Agent, or Firm* — Cooper Legal Group, LLC

(57) ABSTRACT

A sensor device and an operating method thereof are provided. The sensor device includes a microcontroller and a sensor module. The microcontroller performs the operating method. Firstly, the sensor device enters a configuration mode after being activated. The sensor device enters a detection mode after a timeout period. The sensor device is on standby for detecting if any event occurs under the detection mode. When any event is detected, a trigger signal is generated, and the sensor device enters a broadcast mode to broadcast the trigger signal. After another timeout period, the sensor device enters the detection mode again, and is on standby for detecting if the event is restored to a default state. When the event is restored to the default state, the sensor device is reset for detecting if the event occurs.

20 Claims, 6 Drawing Sheets

(51) Int. Cl.

| | |
|---|---|
| *G06F 1/3231* | (2019.01) |
| *G06F 1/3234* | (2019.01) |
| *G09G 3/34* | (2006.01) |
| *G11B 19/02* | (2006.01) |
| *H04N 1/32* | (2006.01) |
| *H04N 5/77* | (2006.01) |
| *H04N 7/18* | (2006.01) |
| *H04N 23/62* | (2023.01) |
| *H04N 23/63* | (2023.01) |
| *H04N 23/65* | (2023.01) |
| *H04N 23/66* | (2023.01) |
| *H04N 23/661* | (2023.01) |
| *H04N 23/90* | (2023.01) |
| *G03B 29/00* | (2021.01) |
| *H04N 101/00* | (2006.01) |

(52) U.S. Cl.
CPC ......... *G06F 1/3265* (2013.01); *G09G 3/3406* (2013.01); *G11B 19/022* (2013.01); *G11B 19/027* (2013.01); *H04N 1/32117* (2013.01); *H04N 5/77* (2013.01); *H04N 7/185* (2013.01); *H04N 7/188* (2013.01); *H04N 23/62* (2023.01); *H04N 23/63* (2023.01); *H04N 23/651* (2023.01); *H04N 23/66* (2023.01); *H04N 23/661* (2023.01); *H04N 23/90* (2023.01); *G03B 29/00* (2013.01); *G09G 2320/062* (2013.01); *G09G 2320/0626* (2013.01); *G09G 2330/022* (2013.01); *G09G 2360/144* (2013.01); *H04N 2101/00* (2013.01); *H04N 2201/3202* (2013.01)

(58) Field of Classification Search
CPC .... H04N 23/651; H04N 23/66; H04N 23/661; H04N 23/667; G03B 29/00
See application file for complete search history.

(56) References Cited

U.S. PATENT DOCUMENTS

| | | | |
|---|---|---|---|
| 2016/0165192 A1 | 6/2016 | Saatchi et al. | |
| 2017/0054951 A1 | 2/2017 | Weekly | |
| 2017/0059274 A1 | 3/2017 | Crist et al. | |
| 2018/0274876 A1 | 9/2018 | Stewart et al. | |
| 2019/0195586 A1 | 6/2019 | Milde, Jr. | |
| 2019/0197354 A1 | 6/2019 | Law et al. | |
| 2020/0217613 A1* | 7/2020 | Hatcher ................... | G08B 5/22 |
| 2020/0355464 A1 | 11/2020 | Estes, III et al. | |
| 2021/0172716 A1 | 6/2021 | Myers et al. | |
| 2023/0101332 A1 | 3/2023 | Guzik et al. | |
| 2023/0209156 A1* | 6/2023 | Lambert .......... | G08B 13/19669 |
| | | | 348/373 |

FOREIGN PATENT DOCUMENTS

| | | |
|---|---|---|
| CN | 115695695 A | 2/2023 |
| TW | M310381 U | 4/2007 |
| TW | M509359 U | 9/2015 |

* cited by examiner

SENSOR DEVICE AND OPERATING METHOD THEREOF

CROSS-REFERENCE TO RELATED PATENT APPLICATION

This application claims the benefit of priority to the U.S. Provisional Patent Application Ser. No. 63/527,509, filed on Jul. 18, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a sensor technology, and more particularly to a sensor device that performs a process for automatically switching operating modes in order to trigger a specific application and an operating method thereof.

BACKGROUND OF THE DISCLOSURE

Currently, security guards, soldiers, or police officers who are required to carry guns or any weapon often wear body cameras at the same time. The body camera can be used to completely record images/videos of the person using the gun or any weapon. These images can be used to resolve future disputes associated with use of the gun. In one further application, these images can also be uploaded to a control center that supports the services of the security guards, the soldiers, or the police officers, so that assistance can be quickly provided in the case of emergencies.

In the conventional technology, the person wearing the body camera needs to manipulate the body camera himself to record videos. However, since the person may forget to activate the body camera for recording videos in dangerous situations, or fail to record key images in time, the function of the body camera is limited.

SUMMARY OF THE DISCLOSURE

In response to the above-referenced technical inadequacies, the present disclosure provides a sensor device and an operating method thereof that are capable of triggering a sensor for a specific application in time. The sensor device includes a microcontroller that is used to control operation of the sensor device. For example, the microcontroller controls a sensor module of the sensor device to sense a specific event.

In the operating method that is performed by the microcontroller of the sensor device, the sensor device is activated to firstly enter a configuration mode after a power is turned on. After a timeout period, the sensor device enters a detection mode, allowing the sensor device to be on standby for detecting if any event occurs. Under the detection mode, a trigger signal is generated when the sensor device detects the event. In the meantime, the sensor device enters a broadcast mode for broadcasting the trigger signal. After another timeout period, the sensor device enters the detection mode again, and is on standby for detecting if the event is restored to a default state.

Further, when the sensor device is under the configuration mode, the sensor device connects with a configuration device via a communication protocol. The configuration device is used to set operating parameters of the sensor device or to retrieve information of operating states and recorded events from the sensor device.

Further, when the sensor device is under the broadcast mode, the sensor device broadcasts the trigger signal via a near-end communication protocol, and a recording function of one or more audiovisual devices is activated after receiving the trigger signal.

Further, when the sensor device detects that the event is restored to the default state under the detection mode, the sensor device is reset and on standby for detecting if the event occurs.

Further, when the sensor device is under the detection mode, the sensor device can enter a detection-off mode if a button of the sensor device is pushed. If the event is detected to be restored to the default state, the sensor device is automatically switched from the detection-off mode to the detection mode.

Moreover, when the sensor device is under the detection mode or the detection-off mode, the sensor device will enter a power-saving mode.

In one embodiment of the present disclosure, the sensor device can be disposed on a holster for detecting whether or not a firearm is pulled out from the holster. If the sensor device detects that the firearm is pulled out from holster, the event occurs, and the trigger signal that includes information of the event and a timestamp of the event is formed. The trigger signal is broadcasted when the sensor device is under the broadcast mode.

Further, when the sensor device is under the broadcast mode and exceeds the timeout period, the sensor device will be switched to the detection mode. When the sensor device detects that the firearm is placed in the holster and the event is restored to the default state under the detection mode, the sensor device is reset and on standby for detecting if the event occurs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
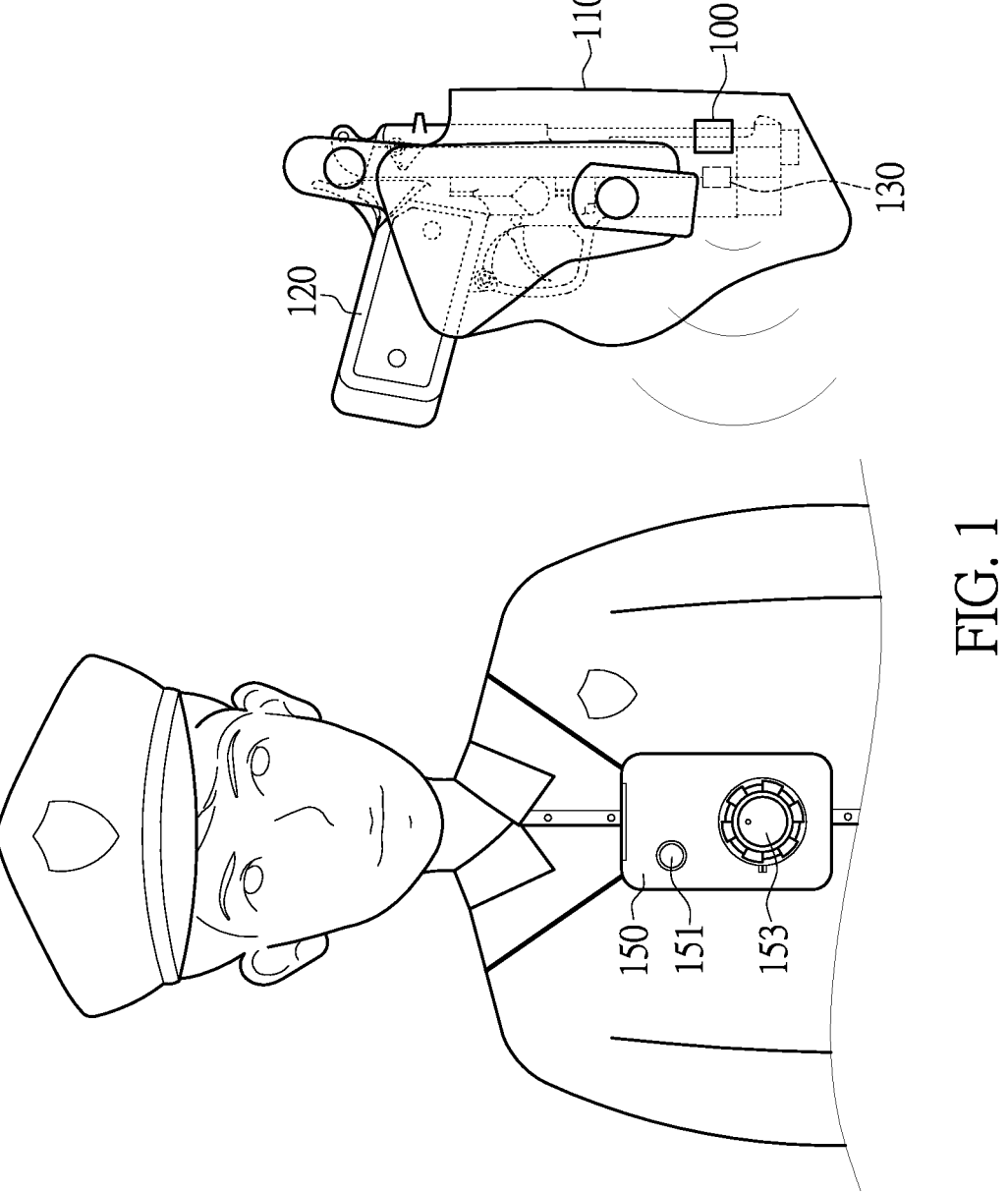
FIG. 1 is a schematic diagram illustrating a sensor device and cooperative peripheral devices connected thereto according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a sensor device and an operating method. The sensor device is a sensor consisting of induction coils. The sensor device applies an electromagnetic induction principle (i.e., movement of a nearby metal object will induce change in inductance), so that the sensor device can sense change in position of a nearby metal object.

Reference is made to FIG. 1, which is a schematic diagram illustrating a sensor device and cooperatively connected peripheral devices according to one embodiment of the present disclosure.

In the diagram, a sensor device 100 is mounted on a holster 110. One of the objectives of the sensor device 100 is to detect whether or not a firearm 120 is pulled out of the holster 110. In an operating method of the sensor device 100, the sensor device 100 is mounted on a surface of the holster 110, and is able to sense a presence of the firearm 120. According to one embodiment of the present disclosure, the firearm 120 can be equipped with a sensor accessory 130. The sensor accessory 130 is preferably a metal object. The position of the sensor accessory 130 attached to the firearm 120 should correspond to the position of the sensor device 100 on the holster 110. The movement of the firearm 120 (being pulled out of or placed in the holster 110) will drive the sensor accessory 130 to move, thereby allowing the sensor device 100 to sense change in inductance. Therefore, a control circuit of the sensor device 100 can determine if the firearm 120 is pulled out of or placed in the holster 110 according to the change in inductance. It should be noted that the sensor device 100 applies the electromagnetic induction principle to detect a status of the firearm 120. The sensor accessory 130 can be adapted to a non-metallic firearm, or can be used when the position corresponding to the position of the sensor device 100 on the holster 110 is non-metallic. It should be noted that it is unnecessary to use the sensor accessory 130 if the body of the firearm 120 is metallic. When the metallic firearm 120 is pulled out of or placed in the holster 110, the sensor device 100 can sense the change in inductance.

FIG. 1 schematically shows a person (e.g., a police officer on duty) who carries the firearm 120 and an audiovisual device 150 at the same time. In the present embodiment, a special event occurs when the sensor device 100 determines that the firearm 120 is pulled out of the holster 110, and a control circuit of the sensor device 100 generates a signal to activate operation of the audiovisual device 150. For example, a recording function of the audiovisual device 150 is activated, so as to start capturing images through a camera lens 151. The audiovisual device 150 is activated to record a live video of the police officer who uses the firearm 120. The audiovisual device 150 also provides a control interface 153, so that a user may manipulate functions of the audiovisual device 150 (e.g., to start recording a live video or to stop recording).

Figure 2:
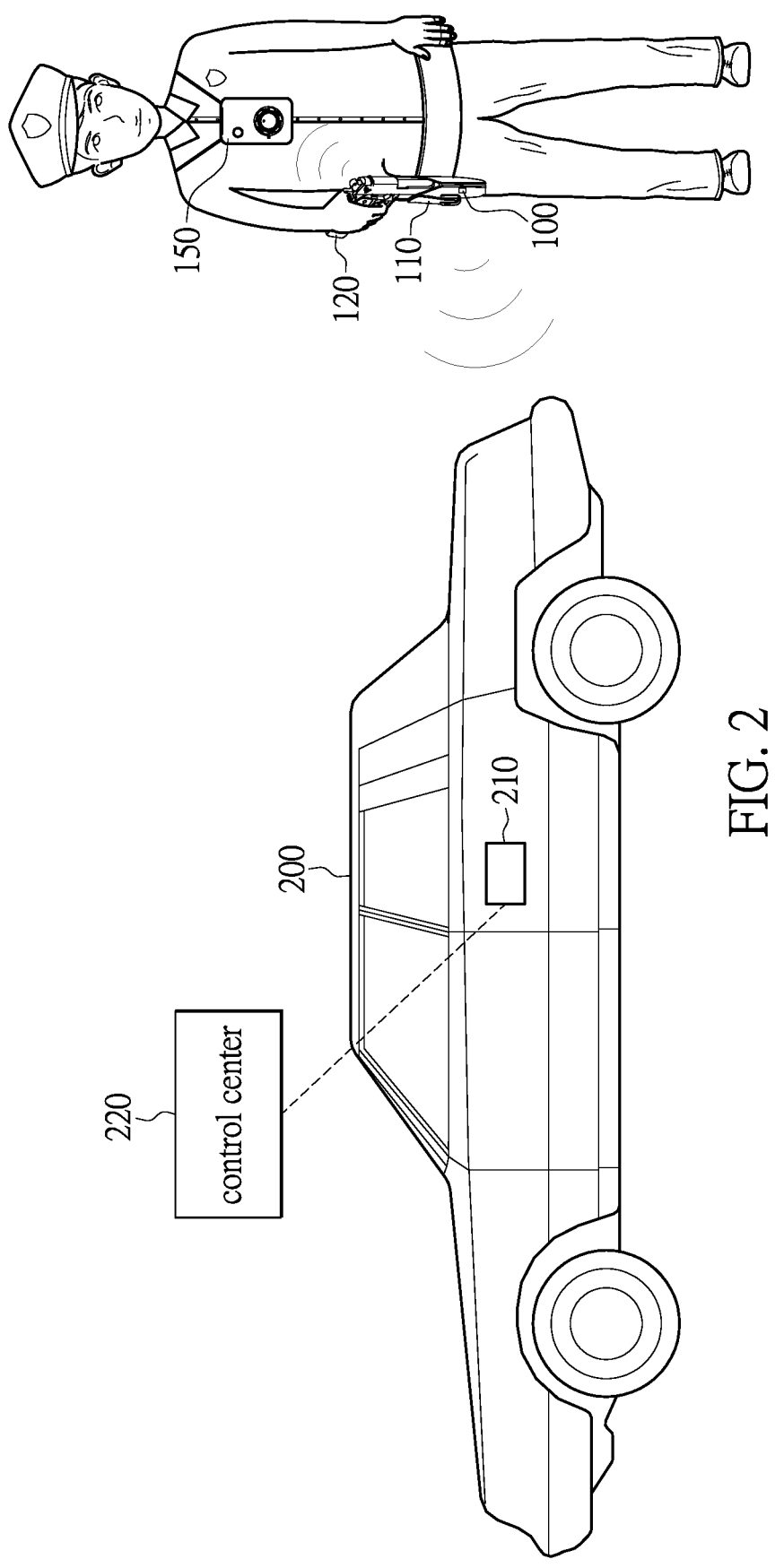
FIG. 2 is a schematic diagram illustrating the sensor device and the cooperative peripheral devices according to another embodiment of the present disclosure.

FIG. 2 shows a schematic diagram illustrating the sensor device and the cooperatively connected peripheral devices according to another embodiment of the present disclosure. A person shown in the diagram wears the audiovisual device 150. The sensor device 100 is disposed on the holster 110 that includes the firearm 120. The sensor device 100 is used to sense change in position of the firearm 120.

The sensor device 100 operates according to the above embodiments. When the sensor device 100 disposed on the holster 110 detects that the firearm 120 is pulled out of the holster 110, the event detected by the sensor device is formed. A trigger signal that includes information of the event and a timestamp of the event is formed. The trigger signal is broadcasted through a near-end communication protocol when the sensor device 100 is under the broadcast mode. After being broadcasted, the trigger signal is received by one or more audiovisual devices 150. Then, the audiovisual device 150 is triggered to operate. An in-car audiovisual system 210 in a vehicle 200 can also be triggered by the trigger signal to operate. Image data related to the event can be transmitted to a control center 220 by the audiovisual device 150. The control center 220 then makes a record of the event.

In one embodiment of the present disclosure, the sensor device 100 disposed on the holster 110 senses that the firearm 120 is pulled out of the holster 110 at a time when, for example, a police officer is on duty and needs to use the firearm 120 in a specific event. In the meantime, a trigger signal is generated and broadcasted to a nearby device, thereby triggering the audiovisual device 150 to start recording. The in-car audiovisual system 210 can also be triggered to start operating upon receiving the trigger signal. Further, the in-car audiovisual system 210 can trigger the audiovisual device worn by a nearby person to start operating, or download a video recorded by the nearby audiovisual device. In addition, the video can be transmitted to the control center 220 via a communication capability of the audiovisual device 150 or the in-car audiovisual system 210.

Figure 3:
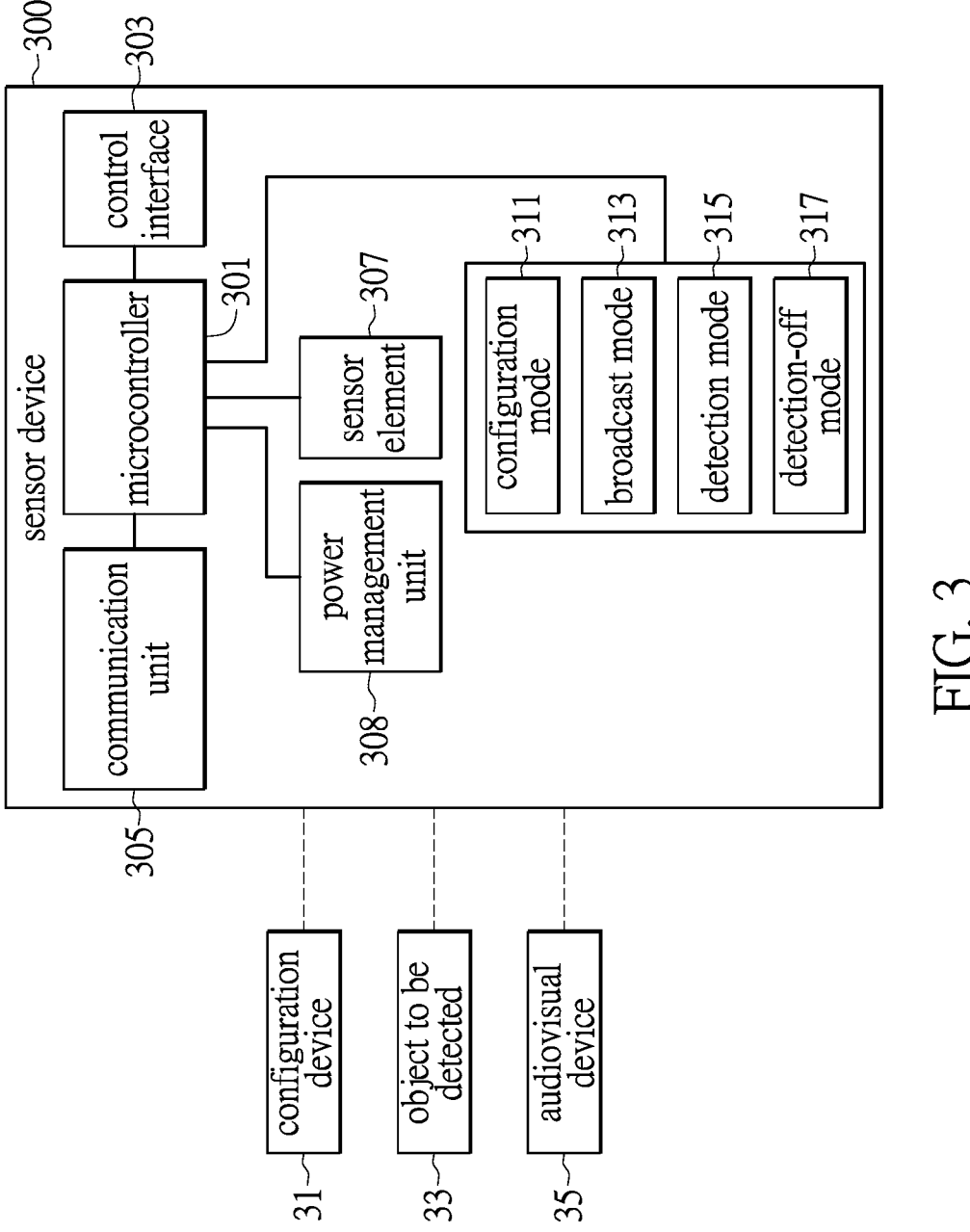
FIG. 3 is a schematic diagram illustrating circuit components of the sensor device according to one embodiment of the present disclosure.

FIG. 3 is a schematic diagram illustrating circuit components of the sensor device according to one embodiment of the present disclosure.

A sensor device 300 shown in the diagram mainly includes a microcontroller 301 and a sensor module that is electrically connected with the microcontroller 301. The sensor module is composed of one or more induction coils that are configured to sense an event. The sensor module implements a proximity sensor or a differential inductance sensor. The sensor module applies the electromagnetic induction principle to sense a specific event. As mentioned above, the sensor module is able to sense if the firearm is pulled out of or placed in the holster via a corresponding sensor accessory.

The microcontroller 301 is used to control operation of the sensor device 300, and operating modes of the sensor device will be switched automatically according to the operating method. The sensor device 300 includes a communication unit 305 that is used to issue broadcast signals or connect with an external device such as a configuration device 31. The communication unit 305 can be implemented by a BLUETOOTH® low energy (BLE) component. The sensor device 300 includes a sensor element 307 consisting of induction coils. The sensor element 307 is used to sense changes of a nearby sensor accessory (e.g., a metal accessory). The sensor device 300 has a control interface 303. The control interface 303 can be a button or a touch interface that allows the user to manipulate the sensor device 300. For example, the user can manually switch the operating modes of the sensor device, turn on the power, or shut down the device via the control interface 303. The sensor device 300 includes a power management unit 308 that is used to manage power supply to the sensor device 300.

According to one embodiment of the operating method of the sensor device 300, the microcontroller 301 controls the sensor device 300 to be operated under a configuration mode 311, a broadcast mode 313, a detection mode 315, and a detection-off mode 317. The sensor device 300 can detect movement of an object to be detected 33 under the detection mode 315. The sensor device 300 can connect with the external configuration device 31 via a communication protocol under the configuration mode 311, so that the configuration device 31 can be used to set operating parameters of the sensor device 300, or to retrieve operating states of the sensor device 300 and the recorded events for external monitoring. When the sensor device 300 detects a specific event, the sensor device 300 is switched to the broadcast mode 313 for broadcasting signals, so that an audiovisual device 35 is activated to operate. In one embodiment, the configuration device 31 can be used to set up groups via a user interface. For example, multiple ones of the audiovisual devices 35 can be grouped and assigned with a group ID. If any of the firearms in the same group is detected to be pulled out of the holster, the audiovisual devices 35 with the same group ID can be activated to start recording at the same time upon receiving the same broadcast signals.

Figure 4:
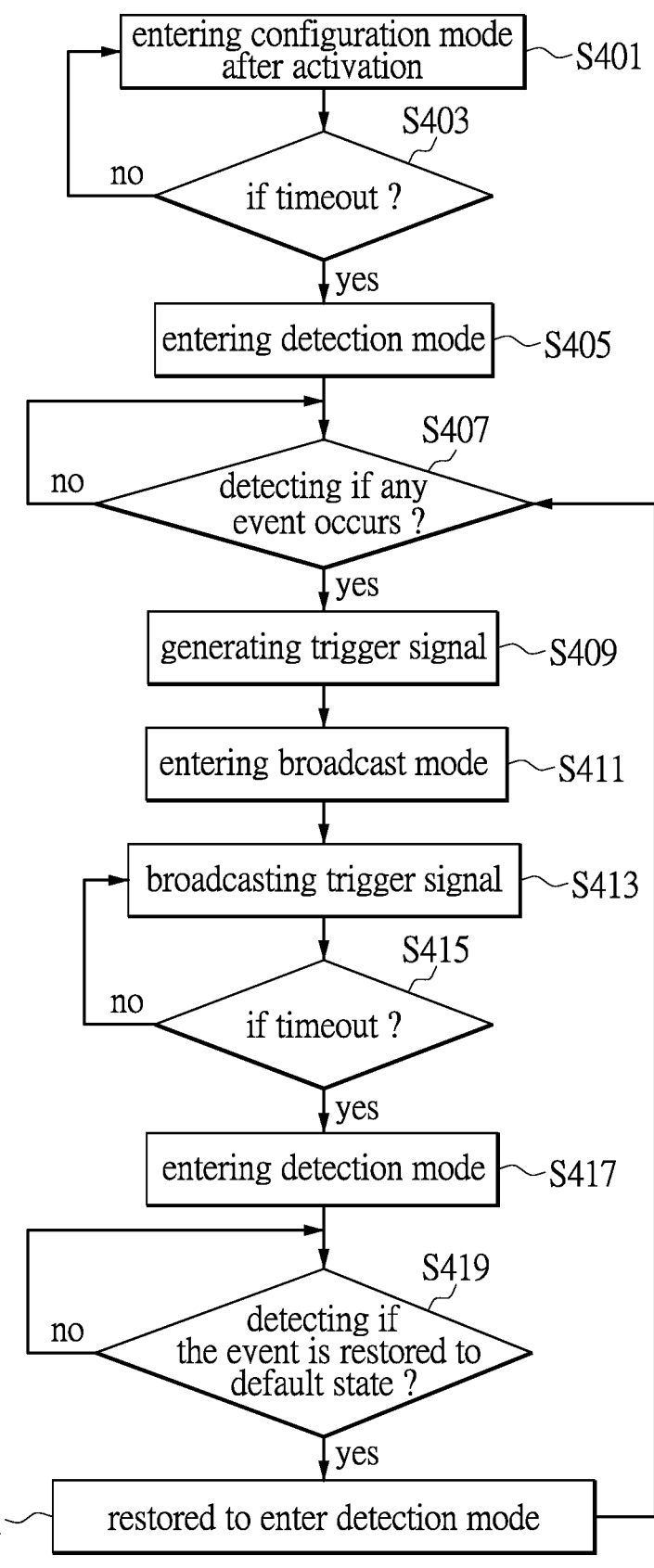
FIG. 4 is a flowchart illustrating an operating method of the sensor device according to one embodiment of the present disclosure.

Reference is made to FIG. 4, which is a flowchart illustrating the operating method of the sensor device according to one embodiment of the present disclosure. Firstly, the sensor device can be powered and activated by a battery. In one embodiment, the sensor device uses a measurement circuit to measure electric quantity of the battery. After the sensor device is activated, the microcontroller of the sensor device can trigger lights of the sensor device to flash or change colors according to the electric quantity of the battery.

In the meantime, the sensor device enters the configuration mode (step S401), and connects with the configuration device. The configuration device is used to set the operating parameters of the sensor device and to retrieve operating records of the sensor device. Under the configuration mode, a timer of the sensor device continues to operate. The microcontroller relies on the timer to determine if a timeout threshold (e.g., 30 seconds) is reached. In step S403, if the microcontroller determines that the timeout threshold is not yet exceeded, the sensor device can still be under the configuration mode. Conversely, if the microcontroller determines that the timeout threshold is exceeded, the sensor device enters the detection mode (step S405) for detecting if any event occurs (step S407).

According to one embodiment of the present disclosure, when the sensor device is used for firearm detection, the event indicates that the firearm is pulled out of the holster. If there is no event to be detected, step S407 is repeated for detecting if any event occurs. If the event is detected, the microcontroller generates a trigger signal (step S409), and the sensor device enters the broadcast mode (step S411) for broadcasting the trigger signal (step S413).

When the sensor device is under the broadcast mode, the sensor device also activates the timer for determining if the broadcast mode exceeds a timeout period (step S415). If the timeout period is not yet exceeded, the sensor device remains under the broadcast mode, such as in step S413. If the microcontroller determines that the timeout period is exceeded, the sensor device enters the detection mode (step S417). In the meantime, the sensor device is on standby for detecting if the event is restored to a default state (step S419). That is, the sensor device detects if the firearm is placed in the holster according to change in inductance. If the event is not yet restored to the default state, the sensor device continues to determine if the event is restored to the default state. If the sensor device detects that the event has been restored to the default state (i.e., the firearm is placed in the holster according to the above-mentioned embodiment), the sensor device is reset to be operated under the detection mode (step S421).

Figure 5:
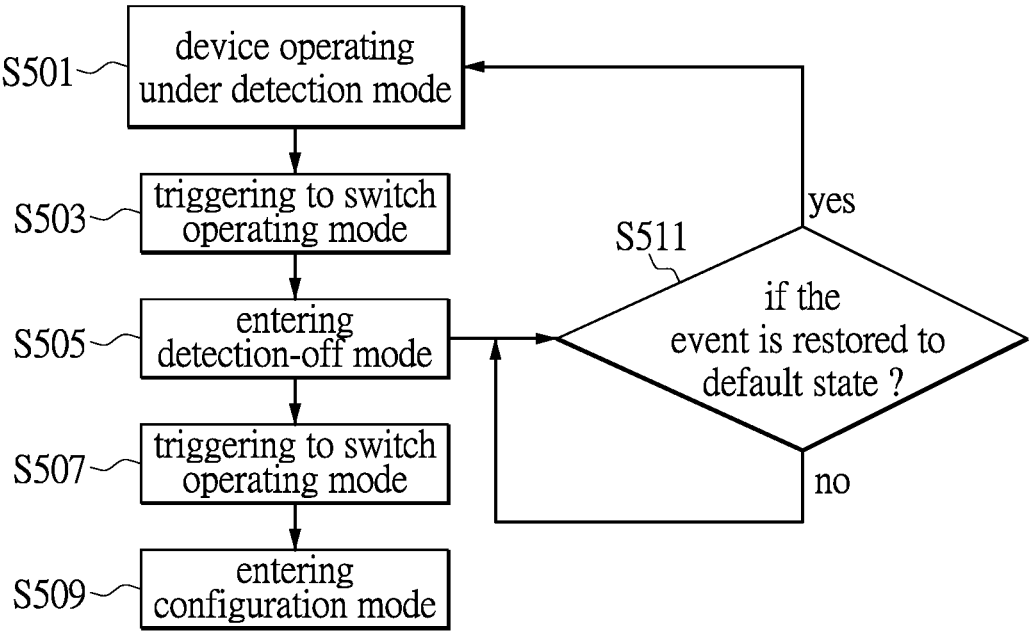
FIG. 5 is a flowchart illustrating the operating method of the sensor device according to another embodiment of the present disclosure.

Reference is made to FIG. 5, which is a flowchart illustrating the operating method of the sensor device according to another embodiment of the present disclosure.

In the present flowchart, the sensor device begins to operate under the detection mode (step S501). At this time, the user can switch the operating modes of the sensor device by a button or a touch interface (step S503). The sensor device currently enters a detection-off mode (step S505), which allows the sensor device to enter a power-saving mode until being switched to a next operating mode (step S507). In the meantime, the sensor device enters the configuration mode (step S509), in which the user is allowed to set the operating parameters of the sensor device by the configuration device, or to retrieve information of the operating states of the sensor device and the recorded events.

It should be noted that the user can enable the sensor device to enter the detection-off mode by pushing the button or touching the touch interface. The detection-off mode does not mean not detecting whether the firearm is in the holster or is pulled out of the holster, but not activating the recording function even if a specific event is detected. For example, the detection-off mode mainly defines a period of time during which the user may clean the firearm, maintain the firearm, or store the firearm in a firearm cabinet. During this period, the sensor device will not activate the recording function when the firearm is pulled out of the holster.

Furthermore, in step S505, when the sensor device enters the detection-off mode, the sensor device can operate with a basic power supply for detecting if the event of the firearm being pulled out of the holster is restored to the default state (step S511). That is, whether or not the firearm is placed back to the holster. If the event is not restored to the default state, the microcontroller repeats step S511 for determining if the event is restored to the default state. If the event is determined to be restored to the default state, the process returns to step S501 for switching the detection-off mode to the detection mode, and the sensor device may operate under the detection mode.

In an exemplary example where the sensor device detects if the firearm is pulled out of the holster, the default state indicates that the firearm is placed back to the holster. For example, when maintenance of the firearm is completed or the firearm is taken out from the firearm cabinet, the sensor device can be automatically switched from the detection-off mode to the detection mode. Alternatively, when the firearm is placed back to the holster, the user can enable the sensor device to return to the default state by pushing the button or touching the touch interface. Once the user pushes the button, the sensor device can be switched from the detection-off mode to the configuration mode, and then back to the detection mode.

Figure 6:
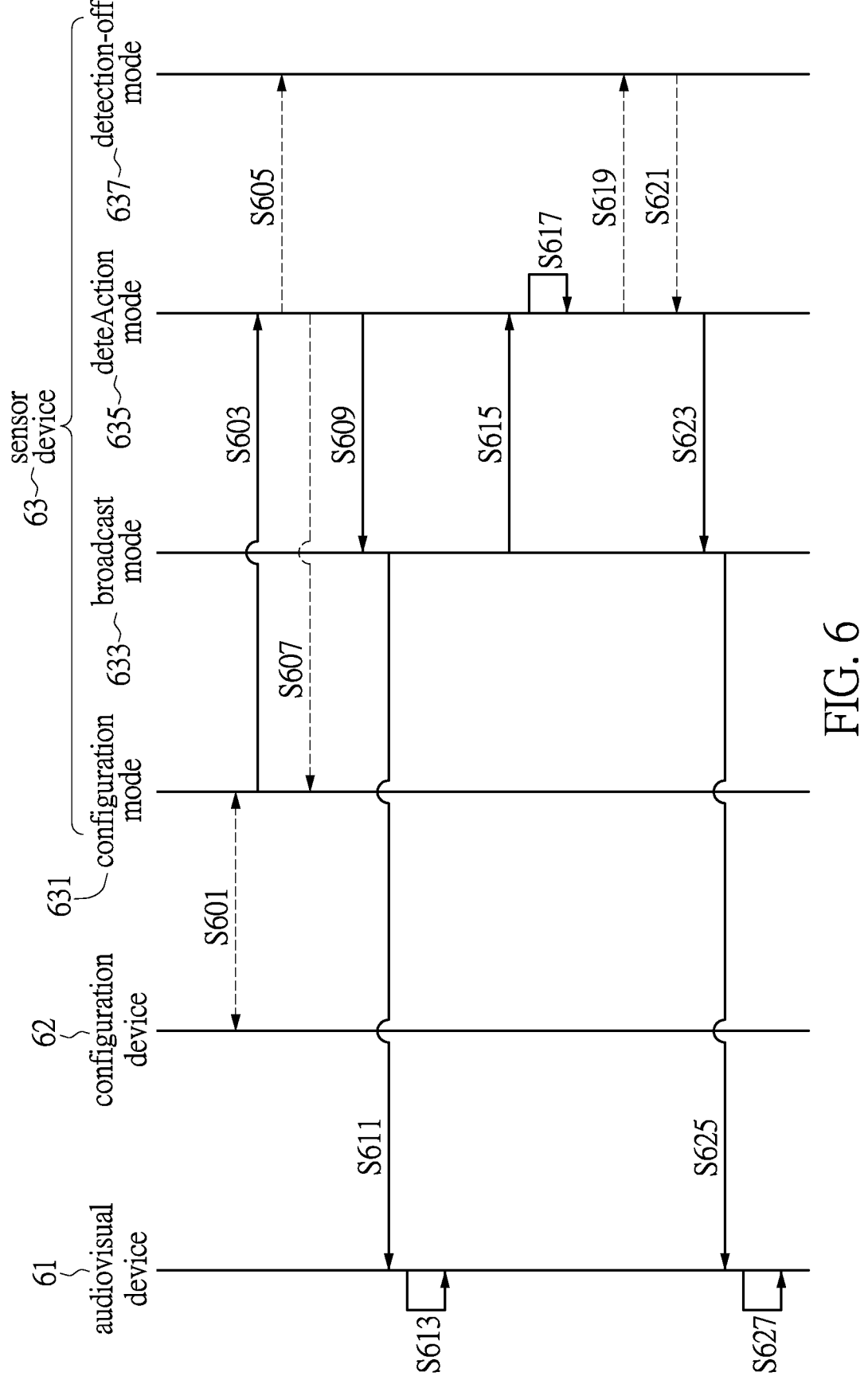
FIG. 6 is a flowchart illustrating operation between the sensor device, an audiovisual device, and a configuration device according to one embodiment of the present disclosure.

Reference is made to FIG. 6, which is a flowchart illustrating operation between a sensor device 63, an audiovisual device 61, and a configuration device 62. The sensor device 63 can operate under a configuration mode 631, a broadcast mode 633, a detection mode 635, or a detection-off mode 637.

The sensor device 63 firstly enters the configuration mode 631 when the sensor device 63 is activated. The configuration device 62 sets operating parameters of the sensor device 63, or retrieves data of the sensor device 63 (step S601). In the meantime, the sensor device 63 determines if the configuration mode 631 exceeds a timeout period. If the timeout period is exceeded, the sensor device 63 enters the detection mode 635 (step S603).

Under the detection mode 635, the sensor device 63 can be switched to one of the various operating modes by pushing a button or detecting any event. Firstly, when the button of the sensor device 63 is pushed, the sensor device 63 enters the detection-off mode 637 (step S605). Secondly, when the sensor device 63 is under the detection mode 635, the sensor device 63 can be switched to the configuration mode 631 if the button is pushed (step S607). Thirdly, when the sensor device 63 is under the detection mode 635 and detects that an event (such as the firearm being pulled out of the holster) occurs, the sensor device 63 enters the broadcast mode 633 (step S609).

When the sensor device 63 enters the broadcast mode 633, the sensor device 63 starts to broadcast a trigger signal that is generated when the event is detected (step S611). The audiovisual device 61 can be activated to start the recording function for capturing images upon receiving the trigger signal (step S613).

When the sensor device 63 enters the broadcast mode 633, the sensor device 63 starts a timeout determination. Once the broadcast mode 633 of the sensor device 63 is determined to exceed a timeout period, the sensor device 63 is switched to the detection mode 635 (step S615). Under the detection mode 635, the sensor device 63 detects that the event is restored to the default state (step S617). For example, the firearm is detected to be placed in the holster. It should be noted that, when the event is detected to be restored to the default state, the microcontroller can reset the sensor device to the detection mode, and the sensor device is on standby for detecting if the event occurs.

In the meantime, the user can push the button to enable the sensor device 63 to enter the detection-off mode 637 (step S619). According to one of the embodiments of the present disclosure, the sensor device 63 can enter the power-saving mode when the sensor device 63 is under the detection mode 635 or the detection-off mode 637. The sensor device 63 can then enter the configuration mode 631 once the button is pushed again. Furthermore, under the detection-off mode 637, the sensor device 63 can continue to detect the event with a minimum power supply.

In the present example, the sensor device 63 detects the event under the detection-off mode 637 (step S621), e.g., the firearm is pulled out of the holster, and then the sensor device 63 enters the broadcast mode 633 (step S623). The trigger signal is generated again, and can be broadcasted (step S625). The recording function of the audiovisual device 61 can be activated when the trigger signal is received (step S627). Afterwards, the above process is repeated.

In conclusion, according to the above embodiments of the sensor device and the operating method provided by the present disclosure, the sensor device can be configured to operate under multiple operating modes. When the sensor device is applied to an application of detecting a firearm and activating operation of an audiovisual device, the sensor device provides a solution for automatic operations based on an event of the firearm being pulled out or not pulled out of a holster. Furthermore, the battery-powered sensor device can temporarily enter a power-saving mode by switching to any of the operating modes, provide information of electric quantity through lights, and allow a user to set operating parameters of the sensor device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An operating method of a sensor device, comprising:
   entering the sensor device into a configuration mode after the sensor device is activated;
   entering the sensor device into a detection mode after a timeout period, wherein the sensor device is on standby for detecting whether or not an event occurs while in the detection mode;
   forming a trigger signal when the sensor device detects the event while in the detection mode, and entering the sensor device into a broadcast mode for broadcasting the trigger signal;
   entering the sensor device into the detection mode after another timeout period, wherein the sensor device is on standby for detecting whether or not the event is restored to a default state while in the detection mode;
   entering the sensor device into a detection-off mode; and when the event is restored to the default state, switching the sensor device from the detection-off mode to the detection mode.

2. The operating method according to claim 1, wherein the configuration mode is provided for a configuration device to set operating parameters of the sensor device or to retrieve information of operating states of the sensor device and recorded events.

3. The operating method according to claim 1, wherein:
when the sensor device detects that the event is restored to the default state while in the detection mode, the operating method comprises resetting the sensor device, and once reset, the sensor device is on standby for detecting whether or not the event occurs.

4. The operating method according to claim 1, wherein;
entering the sensor device into the detection-off mode comprises entering the sensor device into the detection-off mode when a button of the sensor device is pushed while in the detection mode, and
the operating method comprises
after the button is pushed again, entering the sensor device into the configuration mode.

5. The operating method according to claim 1, wherein, when the sensor device is in the detection mode or the detection-off mode, the operating method comprises entering the sensor device into a power-saving mode.

6. The operating method according to claim 1, wherein:
the sensor device is powered and activated by a battery, and
after the sensor device is activated, the operating method comprises triggering lights of the sensor device to flash according to an electric quantity of the battery.

7. The operating method according to claim 1, wherein:
the sensor device is disposed on a holster and used for detecting whether or not a firearm is pulled out of the holster,
forming the trigger signal comprises forming the trigger signal in response to detecting that the firearm is pulled out of the holster, which is the event,
the trigger signal comprises information of the event and a timestamp of the event, and
the operating method comprises broadcasting the trigger signal when the sensor device is in the broadcast mode.

8. The operating method according to claim 7, comprising:
activating a recording function of one or more audiovisual devices upon receiving the trigger signal broadcast from the sensor device while the sensor device is in the broadcast mode.

9. The operating method according to claim 7, comprising:
switching the sensor device from the broadcast mode to the detection mode when the timeout period is exceeded; and
when the sensor device detects that the firearm is placed in the holster and the event is restored to the default state while in the detection mode, resetting the sensor device, wherein the sensor device is on standby for detecting whether or not the event occurs.

10. The operating method according to claim 1, comprising:
assigning the sensor device a group identification (ID) to associate the sensor device with one or more audiovisual devices and one or more other sensing devices while in the configuration mode,
wherein entering the sensor device into the broadcast mode for broadcasting the trigger signal comprises broadcasting the trigger signal to the one or more audiovisual devices having the group ID.

11. A sensor device, comprising:
a microcontroller; and
a sensor module electrically connected with the microcontroller, wherein the sensor module is used to sense an event;
wherein the microcontroller performs an operating method of the sensor device, and the operating method comprises:
entering the sensor device into a configuration mode after the sensor device is activated;
entering the sensor device into a detection mode after a timeout period, wherein the sensor device is on standby for detecting whether or not the event occurs while in the detection mode;
forming a trigger signal when the sensor device detects the event while in the detection mode, and entering the sensor device into a broadcast mode for broadcasting the trigger signal;
entering the sensor device into the detection mode after another timeout period, wherein the sensor device is on standby for detecting whether or not the event is restored to a default state while in the detection mode;
entering the sensor device into a detection-off mode; and
when the event is restored to the default state, switching the sensor device from the detection-off mode to the detection mode.

12. The sensor device according to claim 11, wherein:
when the sensor device is in the configuration mode, the sensor device connects with a configuration device via a communication protocol, and
the configuration device is used to set operating parameters of the sensor device or to retrieve information of operating states of the sensor device and recorded events.

13. The sensor device according to claim 11, wherein:
the sensor device broadcasts the trigger signal through a near-end communication protocol while in the broadcast mode, and
a recording function of one or more audiovisual devices is activated upon receiving the trigger signal.

14. The sensor device according to claim 11, wherein:
the sensor device is powered by a battery, and
when the sensor device is activated by the battery, the sensor module is also activated for sensing the event.

15. The sensor device according to claim 14, wherein:
an electric quantity of the battery is measured by a measurement circuit, and
after the sensor device is activated, the operating method comprises triggering lights of the sensor device to flash according to the electric quantity of the battery.

16. The sensor device according to claim 11, wherein:
when the sensor device detects that the event is restored to the default state while in the detection mode, the operating method comprises resetting the sensor device, and
once reset, the sensor device is on standby for detecting whether or not the event occurs.

17. The sensor device according to claim 11, wherein:
when the sensor device is in the detection mode, the sensor device enters into the detection-off mode by pushing a button of the sensor device.

18. The sensor device according to claim 11, wherein, when the sensor device is in the detection mode or the detection-off mode, the operating method comprises entering the sensor device into a power-saving mode.

19. The sensor device according to claim 11, wherein:

the sensor device is disposed on a holster and used for detecting whether or not a firearm is pulled out of the holster, forming the trigger signal comprises in response to detecting that the firearm is pulled out of the holster, the event occurs, the trigger signal comprises information of the event and a timestamp of the event is formed, and the operating method comprises broadcasting the trigger signal when the sensor device is in the broadcast mode.

20. The sensor device according to claim 19, wherein the operating method comprises:

switching the sensor device from the broadcast mode to the detection mode after the timeout period, and when the sensor device detects that the firearm is placed in the holster and the event is restored to the default state while in the detection mode, resetting the sensor device, wherein the sensor device is on standby for detecting whether or not the event occurs.

\*     \*     \*     \*     \*